Nov. 10, 1925.
C. F. KETTERING
VEHICLE FRAME
Filed May 24, 1921 — 2 Sheets-Sheet 2
1,561,083
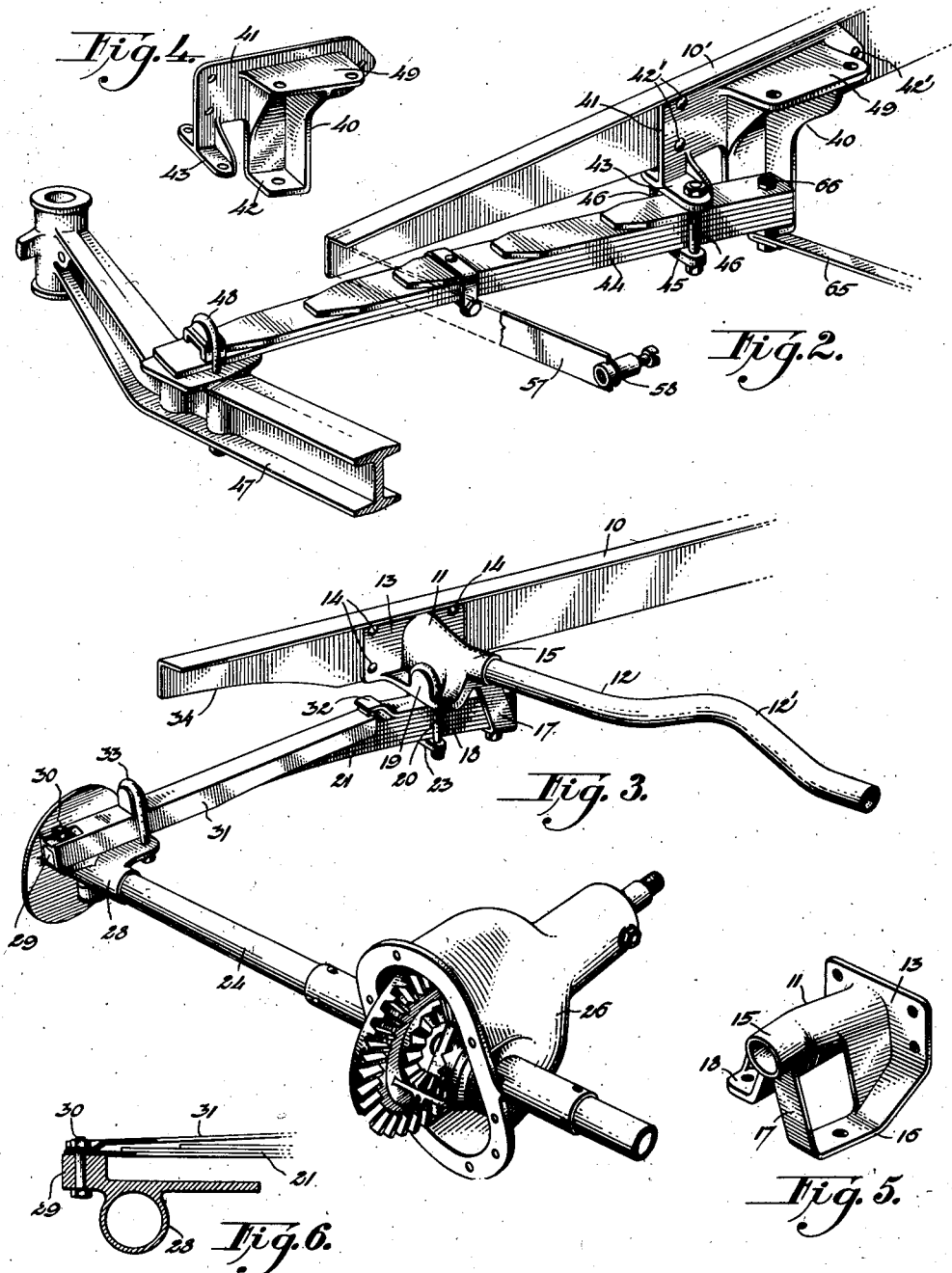

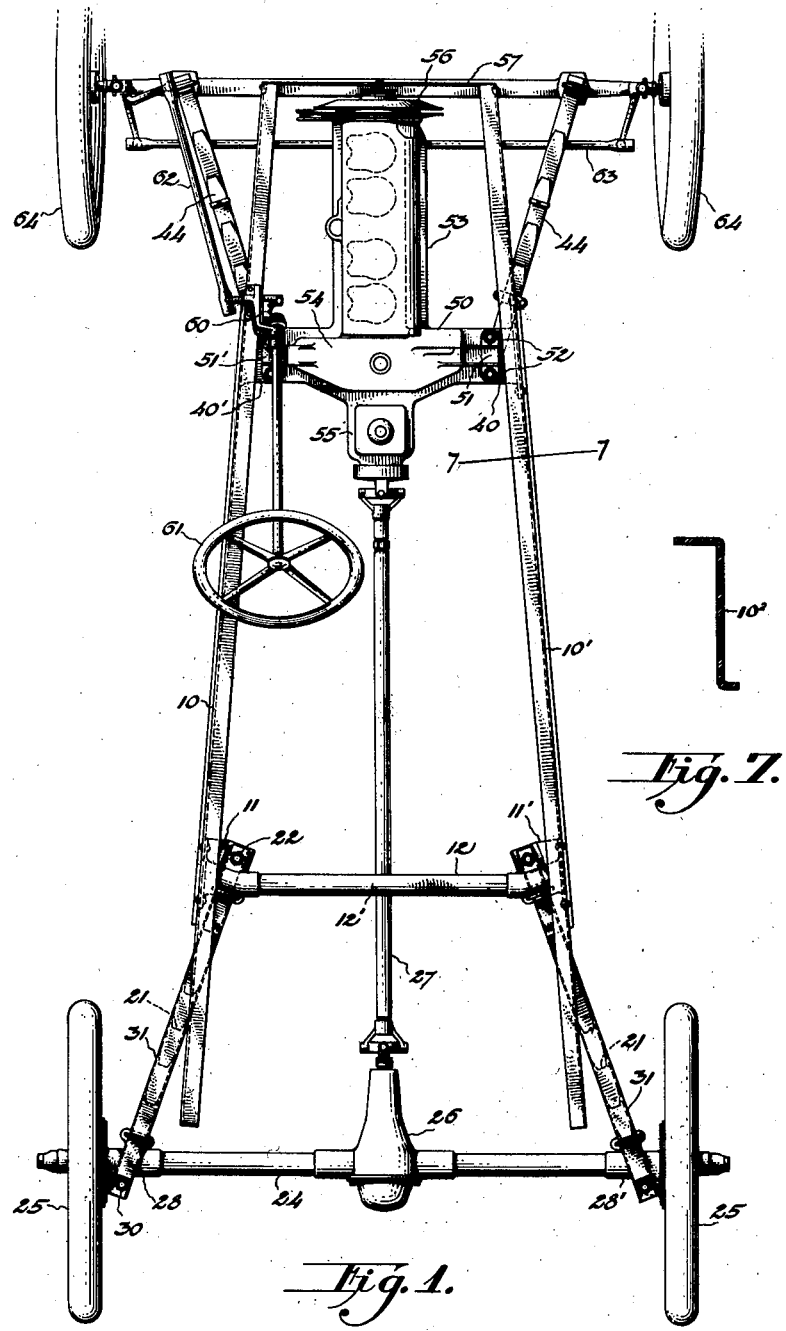

Patented Nov. 10, 1925.

1,561,083

UNITED STATES PATENT OFFICE.

CHARLES F. KETTERING, OF DAYTON, OHIO, ASSIGNOR TO GENERAL MOTORS RESEARCH CORPORATION, OF DAYTON, OHIO, A CORPORATION OF DELAWARE.

VEHICLE FRAME.

Application filed May 24, 1921. Serial No. 472,225.

*To all whom it may concern:*

Be it known that I, CHARLES F. KETTERING, a citizen of the United States of America, residing at Dayton, county of Montgomery, and State of Ohio, have invented certain new and useful Improvements in Vehicle Frames, of which the following is a full, clear, and exact description.

This invention relates to vehicle frames and more particularly to a frame construction forming a part of a motor vehicle chassis.

Among the objects of the invention is an improved vehicle frame of relatively few parts and simple but strong construction and which parts are capable of being fabricated and assembled at a relatively small cost both in labor and material.

Further objects and advantages of the present invention will be apparent from the following description, reference being had to the accompanying drawings, wherein a preferred form of embodiment of the invention is clearly shown.

In the drawings:

Fig. 1 is a plan view of a motor vehicle chassis;

Fig. 2 is a perspective view of a portion of the front end of the chassis;

Fig. 3 is a similar view of a portion of the rear end of the chassis;

Figs. 4 and 5 are perspective views respectively of a front and rear spring bracket.

Fig. 6 is a detail section of a portion of the rear axle housing showing the mounting of the rear spring thereon; and Fig. 7 is a section of one of the longitudinal frame members shown in Fig. 1, taken on line 7—7.

The form illustrated in plan in Fig. 1 comprises a pair of longitudinal side members 10, 10', preferably of angle bars having an L or a Z cross section, although bars of other cross sections may be used if desired.

At a suitable distance from the rear ends of the side members are attached the spring brackets 11, 11, which are connected by a rear cross member 12. The details of the brackets are shown more clearly in Figs. 3 and 5, in which the bracket for the left side is illustrated, it being deemed unnecessary to show in detail the brackets for both sides since those for the two sides are counterparts, being related to each other as "lefts" and "rights". Each bracket comprises a flange 13 adapted to be secured to the web of the side member 10 as by rivets 14. An upper and inwardly extending portion 15 is suitably formed to provide for connection with the transverse frame member 12. The latter is preferably tubular to provide maximum resistance to torsional strains and lightness as well as cheapness and convenience in assembly. The transverse member is rigidly secured to the bracket portion 15 in any suitable manner as by welding or brazing and may be bent upwardly as at 12' to provide clearance for a propeller shaft, or for a torque tube if the latter be employed.

On its forward side the bracket 11 is provided with a spring seat 16 integrally connected at one end to the flange 13 and the body of the bracket and at the other end by the side bar 17 to the tubular extension 15 on the rearward side of the bracket is formed the spring abutment 18 having a U-shaped seat 19 adapted to receive a U-bolt 20. A rear spring 21 which may be a quarter-elliptic or substantially flat leaf spring is secured to the bracket, the rigid end of the spring resting upon the seat 16 and being retained thereon by suitable means, as by a bolt 22 passing through apertures in the leaves and spring seat. A clamping plate 23 held against the lower side of the spring by U-bolt 20 serves to clamp the spring to the lower face of abutment 18.

The position of the spring-retaining parts is such that the springs 21 extend laterally outward or in diverging relation rearwardly so that the rear ends of the springs may be secured to the rear axle housing 24 adjacent to the rear wheels 25, 25. As shown, the rear axle housing comprises a centrally enlarged portion 26, in which may be housed a differential mechanism adapted to transmit power to the wheels 25 from the propeller shaft 27, and end portions 28, 28', each with a block or pad 29 to which the flexible end of the spring may be secured as by bolt 30. If desired, a torque bar 31 may be clamped upon the spring, the front end of which engages under the plate 32 and assists in taking the driving torque and in restraining the spring action. The bar and springs may be retained in position relatively to the rear spring pad by U-bolt 33

The vertical flange of side members 10, 10', may be cut away as indicated at 34 to prevent contact thereof with the springs when the latter are deflected under load.

As indicated above, members 10, 10' may be of L or Z-shaped cross-section. In very light cars the L-shaped member may be used, but in heavier cars it will be found preferable to use a member having a Z-shaped section as shown in Fig. 7 or even an ordinary channel section in order to increase resistance to lateral bending strains.

At a suitable distance from the front end of the frame, toward which the side members 10, 10', preferably converge to some extent, are a pair of spring brackets 40, 40', the bracket designated by 40 being the one designed for the right side of the bar. The bracket is formed with a flange portion 41 adapted to fit against the inner side of the side member 10', being secured thereto as by rivets 42'. A downwardly extending portion is provided with a horizontal spring seat 42, and forwardly of the spring seat is an abutment 43. The rear end of the front spring 44, which spring is of the same type as the rear spring, is retained on the spring seat 42 by suitable securing means, as bolt 66, and is clamped to the abutment 43 as by the plate 45 and bolts 46. The front end of the spring is secured to the front axle 47 in any suitable manner, as by means of U-bolt 48.

The front spring bracket is provided with an inwardly extending ledge 49 adapted to support the engine casing 50, the casing having outwardly extending shoulders or flanges 51, 51', adapted to be rigidly secured to the flanges or ledges 49, as, for example, by bolts 52. The engine casing 50 may include in one piece the crank casing 53, the flywheel casing 54, and the transmission casing 55, with which construction the flanges 51, 51', will be formed preferably on the flywheel casing portion 54. The engine shown is a four cylinder internal combustion engine of the air cooled type having a fan 56 at the forward end. The invention contemplates, however, the utilization of the engine frame or casing as a part of the vehicle frame, irrespective of the specific details of the engine and is therefore in no way limited to use with the type of engine illustrated.

The engine is preferably provided with a third support which may comprise a transverse bar 57 secured at its ends to the front ends of the side bars 10, 10', and having at an intermediate point a collar 58 adapted to receive a projecting portion of the engine casing, which portion may also serve as a bearing for the engine shaft and for a manually operable starting device when it becomes necessary to utilize the latter.

Suitable steering mechanism may be provided comprising, as illustrated, steering gear 60 mounted upon the frame member 10, operable by the wheel 61, and connected by links 62, 63, to dirigible front wheels 64.

A cross brace 65 may be connected to the front spring brackets, joining the same below the level of the engine frame connection, and thereby relieving the brackets of some strain due to the action of the front springs.

It will be noted that both the front and rear springs diverge in the direction of the axle in order to provide for attachment to the axles adjacent the ends thereof, thereby affording as wide a supporting base as possible for the vehicle body and other spring-supported parts. This divergence of the springs also causes the deflection of the springs to be accompanied by a certain amount of twisting or torsional distortion which introduces a resistance to deflection increasing at a greater rate than the rate of deflection. The springs arranged as shown therefore possess inherent shock-absorbing properties greater than would be present if the springs were arranged parallel to each other. Furthermore, the attachment of the springs at intermediate points of the frame only very materially shortens the portion of the latter which has to sustain stresses due to distortion under load or road conditions. The mounting of the spring brackets on the inner sides of the longitudinal frame members and utilizing them as portions of the transverse frame members, and the mounting of the engine frame rigidly upon the front brackets to thereby serve as a portion of the forward transverse frame member also greatly reduces the weight of the entire chassis, while contributing materially to its compactness and strength. The main chassis frame may therefore be made extremely strong and rigid notwithstanding the use of much lighter frame elements than would ordinarily be considered practicable. The construction further permits of the use of easily fabricated forms of angle bar for the main longitudinal frame members, of a mere section of tubing for the rear cross member, and a piece of flat or L-bar for the connecting member at the extreme front end. The cost of the frame proper is thereby greatly reduced not only for the material required, but for the time and labor necessary in fabricating and assembling the parts.

I have described the longitudinal side members as L-bars or Z-bars, and such bars have been found amply strong for a light chassis. They furthermore afford advantages in facilitating manufacture and assembly since the web and flange may be shaped by simple shearing operations and the spring brackets and other parts may be more readily located and attached with less complication in form and accuracy in fitting than would be necessary with frame members of other contours. It will be understood, however, that other forms either of commercial profile iron or of special design may be used if desired for particular reasons or in special relations. While I have herein described the spring brackets as being riveted to the side frame members, it will be obvious that the manner of securing the brackets will vary with the specific character of the frame member and with the strength and rigidity required. If desired, additional means may be provided to assist in relieving the rivets of shearing strains, as, for example, by striking inwardly from the web of the frame member a lug or lugs against which suitably bored or cut-away or otherwise shaped parts of the spring bracket may fit. Various other changes may be made in details of construction and in proportions and design of the spring brackets and other parts without departing from the scope of the invention and therefore I do not desire to be limited to the specific structure described except as required by the language of the claims in view of the prior art.

I claim:

1. In combination with a vehicle frame comprising two longitudinally extending side members, two spring brackets secured one to each of said side members upon the inner side thereof; two springs fixedly secured at one end one to each of the brackets aforesaid, and which springs extend from said brackets across said side members and diverge from one another; and a cross member extending between said side members, and the two ends of which are fastened one to each of said brackets.

2. In a vehicle frame, two longitudinal side members, a spring bracket secured to the inner side of each side member, and a tubular element connecting said brackets and constituting together with said brackets a cross member for said frame.

3. A combined spring bracket and frame connecting member for a vehicle chassis comprising a body portion adapted to be attached to the inner side of a longitudinally extending vehicle frame member, spring supporting means arranged below said body so that the end of a spring supported thereby will lie below said longitudinally extending frame member, and a means for attachment of the ends of a cross member to the body portion aforesaid of said bracket, to thereby hold the longitudinally extending frame members properly spaced relative to one another.

4. In an automobile chassis, a pair of longitudinal side frame members, two transverse frame members connecting said side members, each said transverse member including two spring brackets secured to the inner sides of said side members, and quarter elliptic springs connected to the spring brackets below the level of said side members and extending beneath said members, one pair diverging forwardly to a front axle and the other pair diverging rearwardly to a rear axle.

In testimony whereof I hereto affix my signature.

CHARLES F. KETTERING.